United States Patent Office 2,831,655
Patented Apr. 22, 1958

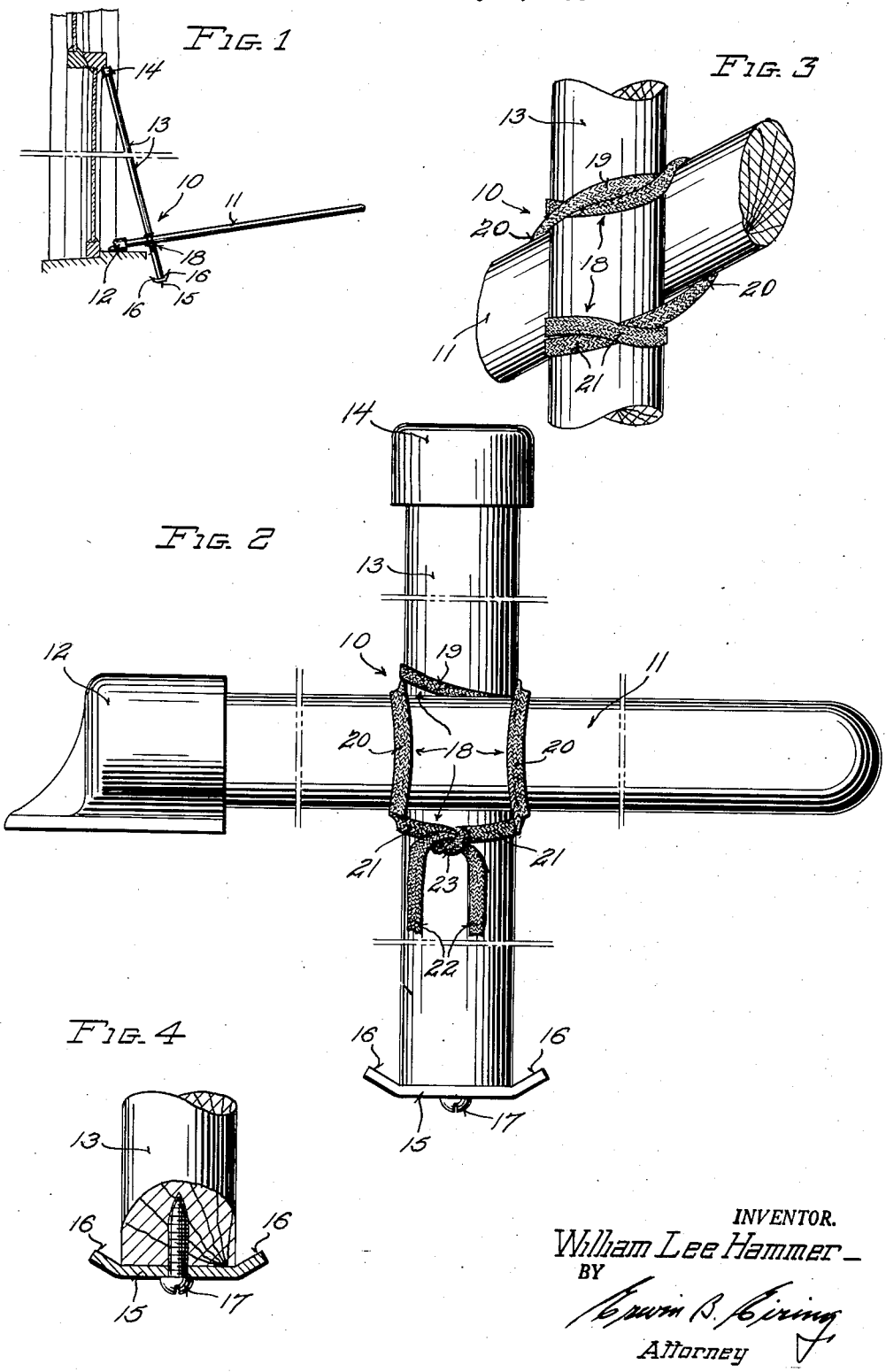

2,831,655
ADJUSTABLE FRICTION GRIP HOUSEHOLD JACK

William Lee Hammer, Wauwatosa, Wis.

Application July 27, 1954, Serial No. 446,056

4 Claims. (Cl. 254—129)

This invention relates to a lever type adjustable friction grip household jack.

Numerous tasks about the home could be greatly facilitated by the use of a simple and effective household jack. To the best of my knowledge no such device is available at the present time.

The primary object of the present invention resides in the provision of a simple, inexpensive and effective lever type adjustable friction grip household jack which is light in weight, easily adjusted and manipulated and effective to accomplish any of a number of household tasks such as lifting heavy pieces of furniture, opening window sashes which are tight from paint or swelling and similar chores which at the present time are too arduous or tax the strength of the average housewife.

A further object of the present invention residues in the provision of a simple and effective adjustable friction grip household jack of the lever type comprising an arm and strut which are cylindrical in shape, of substantial length and formed of any suitable material such as hard wood, metal rods or tubing suitably lashed together to provide an actuating member in the form of the lever arm and a thrust carrying member in the form of the strut.

Another object of the present invention resides in the provision in a household jack of a lashing means wrapped about the arm and strut in a manner to provide a coupling connection between them which is capable of slidable movement on either or both of the arm and strut to permit the proper relative adjustment between the arm and strut to afford the desired mechanical advantage or lever action when the device is put to use.

Another object of the invention resides in the provision of a lashing means adapted to be wrapped about the arm and strut to provide a slidable, flexible, pivotal coupling connection between the arm and strut when in unstressed condition and responsive to relative angular movement between the arm and strut to stress the lashing means and frictionally retain the same in adjusted position on the arm and strut.

Another object of the present invention resides in the use of a lashing means in the form of a relatively narrow flexible strip of longitudinally non-elastic woven material which is responsive to relative angular movement between the arm and strut to effect the stressing of the lashing means on both the arm and strut to frictionally retain the lashing means in the selected position of adjustment on the arm and strut to form a fixed rockable pivot between them.

A more specific object of the present invention resides in the provision of a yieldable pad or cushion member on one end of the arm and the strut to prevent marring or damage to the article to be moved.

Another more specific object of the invention resides in the provision of an article engaging foot positioned on one extremity of the strut to facilitate the use of the jack as a tension transmitting device.

Other objects and advantages of the invention will become apparent from the following description of an illustrative embodiment thereof.

In the drawing:

Figure 1 is a diagrammatic side elevational view of a lever type adjustable friction grip household jack, constructed in accordance with the teachings of the present invention, as it might be applied to effect the raising of the lower sash of a window which is stuck in closed position in a window casing because of paint, swelling or other conditions;

Fig. 2 is a fragmentary elevational view illustrating the application of the lashing means to form a flexible coupling between the arm and strut which is adjustable in unstressed condition on either or both the arm and strut and which becomes fixed in a preselected position on both members upon the relative rocking movement between the arm and strut by the application of a torsional stress on the lashing means to frictionally retain the lashing means in fixed position on both the arm and strut in response to relative angular movement between them;

Fig. 3 is a fragmentary perspective view illustrating the stressed condition of the lashing means to frictionally retain it in fixed position upon the arm and strut under the influence relative angular movement between the arm and strut; and Fig. 4 is a detail sectional view showing the application of an article engaging foot on one extremity of the strut to provide a means by which the device may be utilized to effect movement of an object under tensional stress.

The adjustable friction grip household jack 10 chosen for illustrative purposes in the accompanying drawing and constructed in accordance with the teachings of the present invention comprises an arm 11 which is cylindrical in form, has substantial length and is formed of any suitable material such as hard wood, a metallic rod or metal tubing. One end of the arm 11 is provided with a soft yieldable or resilient cushion, pad or cap 12.

A strut 13 having length substantially equal to that of the arm 11 and formed in a manner similar thereto is provided on one of its ends with a soft yieldable or resilient cushion, pad or cap 14 and the other end of the strut is provided with a metal plate 15 having laterally projecting feet 16 which extend beyond the cylindrical surface of the strut 13. The plate 15 is applied to the end of the strut 13 in any suitable manner such as by the application of a cap screw 17 in the event that the strut 13 is formed of hard wood or by the application of a machine screw to a tapped hole in the event that the strut 13 is formed of metal.

A lashing means 18 preferably in the form of a relatively narrow long strip of longitudinally non-elastic woven material serves to provide a yieldable coupling for retaining the arm 11 and strut 13 in desired associated relationship. The central portion 19 of the lashing means 18 is wrapped about the strut 13 to form at least one overlap of the lashing means. The arm 11 is then positioned against the strut 13 and disposed at a substantial right angle thereto immediately below the central portion 19 of the lashing means. Adjacent portions 20 of the lashing means 18 are then wrapped about the arm 11 on opposite sides of the strut 13. The next adjacent portions 21 of the lashing means 18 are overlapped behind the strut 13 and the free ends 22 wrapped about the strut 13 immediately below the arm 11 and tied into a knot 23. The portions 19 and 21 are disposed in spaced relationship on the strut 13 and lie respectively above and below the top and bottom surface of the arm 11. The portions 21 of the lashing means 18 which are wrapped around the arm 11 are also disposed in spaced relationship thereon adjacent the sides of the strut 13.

The foregoing arrangement of the arm 11, strut 13 and the lashing means 18 provides a flexible pivotal connection between the arm 11 and the strut 13. When the lashing means 18 is in unstressed condition, it is possible to slidably adjust the wrapped portions of the lashing means along either the arm 11 or the strut 13. Such movement may be facilitated by the rotation of either the arm 11 or strut 13 as they are selectively pushed or pulled through the wrapped portions of the lashing.

Referring more particularly to Fig. 1 of the accompanying drawing, it will be noted that the arm 11 and strut 13 have been relatively adjusted to a position in which the lashing 18 is disposed in relatively close proximity to the cap 12 which is placed on a fixed support such as a window sill and forms a fulcrum about which the arm 11 may be rocked. The positioning of the lashing means 18 in the above manner affords a great mechanical advantage if the lifting force is applied adjacent the free end of the arm 11. The strut 13 is in a vertical position with respect to the arm 11 and the cap 14, disposed on the upper extremity of the strut 13, is placed in contact with the lower surface of the center bar of the bottom sash of the window adjacent one of its corners when the arm 11 is held in substantially horizontal position. The initial upward movement of the free end of the arm 11 serves to stress and tighten the wrapped portions of the lashing 18 in their adjusted positions on the arm 11 and strut 13 to frictionally retain them in fixed position thereon while permitting relative pivotal angular movement between the arm 11 and strut 13. The marked mechanical advantage obtained through the use of the full length of the arm 11 serves to transmit a strong lifting force against the cross bar of the window sash through the medium of the strut 13. After lifting pressure has been applied to the lower sash adjacent one upper corner thereof, the entire device may be shifted to the other upper corner of the sash where the identical action is repeated. In many instances the lower sash will be freed by two operations of the device. In the event that the sash is not so freed, the operations may be repeated more vigorously to effect the freeing of the sash in the window casing.

The foregoing description of the present lever type adjustable friction grip household jack has been concerned primarily with its use in transmitting forces under compression. The device is adapted to be utilized with equal facility for transmitting forces under tension by reversing the strut 13 end for end and utilizing the foot 16 as the article engaging surface of the jack. In this instance, the cap 12 on the arm 11 is placed on a fixed support and the arm 11 is rocked to fix the adjusted position of the lashing and place the strut 13 under tension.

It is also to be understood that the jack 10 may be utilized for elevating or moving comparatively heavy pieces of furniture by the manipulation of the jack in the manner previously described in connection with the opening of a window sash.

From the foregoing description it will readily be understood that a simple, inexpensive and effective lever type adjustable friction grip household jack has been provided in a form which is light in weight, simple in operation and readily adapted for facilitating the accomplishment of numerous household chores.

While the invention has been described in considerable detail in the foregoing specification, it is to be understood that various changes may be made in its embodiment without departing from or sacrificing any of the advantages hereinafter claimed.

I claim:

1. An adjustable friction grip household jack comprising an arm, a strut, and a lashing means formed of a relatively narrow strip of longitudinally non-elastic woven material having a length sufficient to permit its being wrapped about said arm and strut in a manner to provide a slidable coupling between them when said lashing means is in unstressed condition to afford a means for the selective positioning of said lashing means on said arm and strut to afford desired mechanical advantage between them, one end of said arm being adapted for positioning on a fixed suport to form a fulcrum on which said arm may be rocked, one end of said strut being adapted for positioning in contact with a surface of an object to be moved, said lashing means being responsive to rocking movement of said arm on said arm and strut to stress and frictionally fix said lashing means on said arm and strut to form a force transmitting rockable connection therebetween whereby rocking movement of said arm on its fulcrum transmits a force on the surface of the object to be moved through the medium of said strut.

2. An adjustable friction grip household jack, as set forth in claim 1, in which the wrapped portions of said lashing means are disposed in spaced relationship on each of said arm and strut and the portions of said lashing means connecting said wrapped portions are each placed in tension upon relative angular movement between said arm and strut to frictionally anchor said lashing means on said arm and strut.

3. An adjustable lever type household jack comprising a cylindrical arm of substantial length, a cylindrical strut of substantial length, and a lashing means in the form of a strip of longitudinally non-elastic flexible material for application to said arm and strut to retain them in associated relationship and form a slidable flexible connection between them when they are in substantial perpendicular relationship and said lashing means is in unstressed condition to permit relative adjustable positioning of said arm and strut to afford the desired mechanical advantage for said arm, one end of said arm being adapted for positioning on a fixed support to form a fulcrum on which said arm may be rocked, one end of said strut being adapted for positioning in contact with a surface of an object to be moved, said lashing means being stressed in response to rocking movement of said arm on its fulcrum to frictionally fix said lashing means on said arm and strut to form a force transmitting rockable connection therebetween whereby rocking movement of said arm on its fulcrum transmits a force on the surface of the object to be moved through the medium of said strut.

4. An adjustable lever type household jack comprising a cylindrical arm of substantial length, a cylindrical strut of substantial length, and a lashing means formed of a relatively narrow strip of longitudinally non-elastic flexible woven material adapted to be wrapped around said arm and strut to bind the same together and form a slidable flexible joint between them when they are in substantial perpendicular relationship and said lashing means is in unstressed condition on both said arm and strut to selectively position the flexible joint between them at a point providing suitable mechanical advantage for said arm, one end of said arm being adapted for positioning on a fixed support to form a fulcrum on which said arm may be rocked, one end of said strut being adapted for positioning in contact with a surface of an object to be moved, said lashing means being stressed in response to rocking movement of said arm on its fulcrum to stress and frictionally fix said lashing means on said arm and strut to form a force transmitting rockable connection therebetween whereby rocking movement of said arm on its fulcrum transmits a force on the surface of the object to moved through the medium of said strut.

References Cited in the file of this patent

UNITED STATES PATENTS

| 452,235 | Phare | May 12, 1891 |
| 1,545,404 | Dorau | July 7, 1925 |

FOREIGN PATENTS

| 16,309 | Great Britain | of 1891 |